United States Patent
Lai

(12) 
(10) Patent No.: US 6,711,967 B1
(45) Date of Patent: Mar. 30, 2004

(54) TREADING TYPE VEHICLE DRIVING DEVICE

(76) Inventor: Chin-Chou Lai, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/244,848

(22) Filed: Sep. 17, 2002

(51) Int. Cl.$^7$ ................................................ G05G 1/14
(52) U.S. Cl. ............................................ 74/561; 74/131
(58) Field of Search ........................ 74/130, 131, 435, 74/561

(56) References Cited

U.S. PATENT DOCUMENTS

| | | | | |
|---|---|---|---|---|
| 2,712,857 A | * | 7/1955 | Jackson ........................ 74/561 |
| 4,135,409 A | * | 1/1979 | Ishimaru ...................... 74/128 |
| 4,828,284 A | * | 5/1989 | Sandgren ..................... 280/221 |
| 5,284,355 A | * | 2/1994 | Ishii ............................ 280/282 |
| 5,716,069 A | * | 2/1998 | Bezerra et al. ............. 280/253 |
| 6,241,269 B1 | * | 6/2001 | Fan ............................. 280/265 |
| 6,325,400 B1 | * | 12/2001 | Lai .............................. 74/512 |
| 6,398,244 B1 | * | 6/2002 | Chueh ........................ 74/594.1 |

* cited by examiner

Primary Examiner—Rodney H. Bonck
Assistant Examiner—Dennis Abdelnour

(57) ABSTRACT

A treading type vehicle driving device includes a substrate, a first transmission assembly, a second transmission assembly, a treadle structure, a gear assembly and a position limiting plate. The straight-cut gear A can move reciprocally along the trenches of the slant-cut gears C1 and C2 so as to drive the straight-cut gear A to engage with the straight-cut gear B2 of the first transmission assembly (treading forwards), or to engage with the straight-cut gear D of the second transmission assembly 2A (treading backwards). When the pedal is treaded forwards and backwards, the vehicle moves forwards rapidly with less power. The straight-cut gear A will separate from the engagement of the straight-cut gear B2 or straight-cut gear D of transmission assembly since the teeth trench of the slant-cut gears moves on the slant-cut fan gear(forwards is C1 and backwards is C2); thereby, wheels rotate continuously.

3 Claims, 5 Drawing Sheets

TREADING TYPE VEHICLE DRIVING DEVICE

FIELD OF THE INVENTION

The present invention relates to driving devices, and particularly to the treading type vehicle driving device, wherein when the pedal is treaded forwards and backwards, the vehicle moves forwards rapidly with less power.

BACKGROUND OF THE INVENTION

Referring to FIG. 1, a preferred vehicle treadle structure disclosed in U.S. Pat. No. 6,325,400, "Treadle-type vehicle body forward drive structure" is disclosed. The treadle structure is mainly formed by a base plate 6, a transmission assembly 7 and a treadle structure assembled to the base plate 6, a gear assembly 9 positioned between and exactly engaged with the transmission assembly 7 and the treadle structure 9, and a position limiting plate (not shown) for confining the transmission structure to the base plate 6.

By the follower shaft 71 of the transmission assembly 7 to be assembled to the hub of the rear wheel E to drive the vehicle to move forwards, when the treadle rod 8 moves downwards slightly, the slant-cut fan gear 82 of the treadle rod may drive the gear assembly 9 engaged therewith moves along the teeth edge of the slant-cut gear C so as to drive the straight-cut gear of the gear assembly to be engaged to the straight-cut gear B of the transmission assembly 7. When the treadle rod 81 moves downwards continuously, the slant-cut fan gear 82 of the treadle structure 8 drives the slant-cut gear C of the gear assembly 9 to rotate synchronously with the straight-cut gear A so that the straight cut gear A is engaged with the straight-cut gear B of the transmission assembly 7 so as to drive the follower gear for driving the rear wheel to rotate. Thus, the vehicle moves forwards.

However, the prior art structure only provides that one leg treads the pedal. More power and time are necessary and the speed is halved.

SUMMARY OF THE INVENTION

Accordingly, the primary object of the present invention is to provide a treading type vehicle driving device including a substrate, a first transmission assembly, a second transmission assembly, a treadle structure, a gear assembly and a position limiting plate. The follower shaft of the first transmission assembly is engaged with a straight-cut gear B1 and straight-cut gear B2. And the follower shaft drives the rear wheel to rotate synchronously. The driving shaft of the second transmission assembly is engaged to a straight-cut gear D. The straight-cut gear D is engaged to the straight-cut gear B1 of the first transmission assembly. The slant-cut fan gear of the treadle structure is exactly engaged to the slant-cut gears C1 and C2 of the gear assembly for driving the gear assembly to move. The straight-cut gear A can move reciprocally along the trenches of the slant-cut gears C1 and C2 by the slant-cut fan gear so as to drive the straight-cut gear A to engage with the straight-cut gear B2 of the first transmission assembly (treading forwards), or to engage with the straight-cut gear D of the second transmission assembly 2A (treading backwards). When the pedal is treaded forwards and backwards, the vehicle moves forwards rapidly with less power.

Another object of the present invention is to provide a treading type vehicle driving device, wherein the straight-cut gear A will separate from the engagement of the straight-cut gear B2 or straight-cut gear D of transmission assembly since the teeth trench of the slant-cut gears (forwards is C1 and backwards is C2) moves on the slant-cut fan gear; thereby, wheels rotate continuously.

The various objects and advantages of the present invention will be more readily understood from the following detailed description when read in conjunction with the appended drawing.

DETAILED DESCRIPTION OF THE PREFERRED EMBODIMENTS

Figure 1:
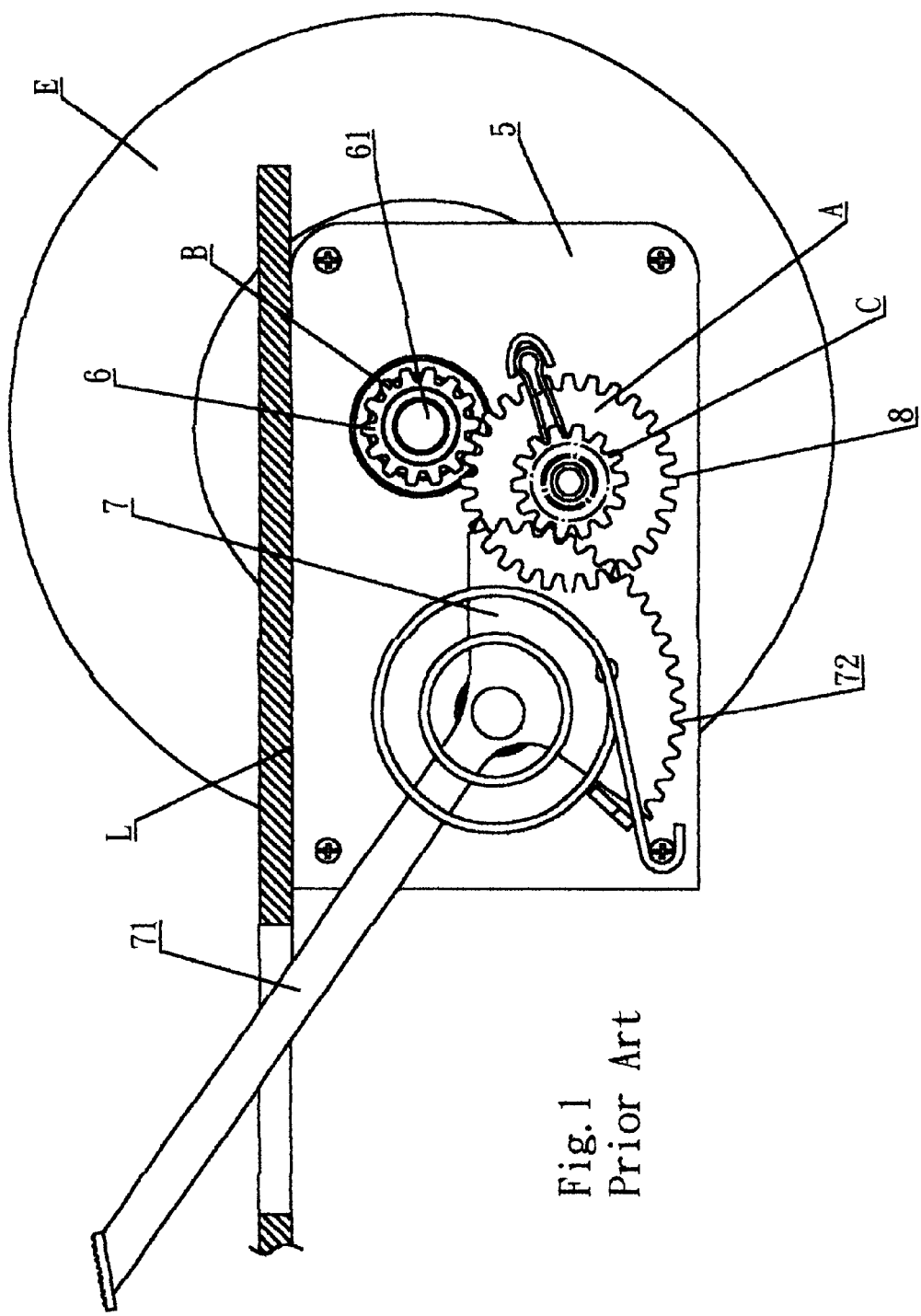
FIG. 1 is a plane view showing one embodiment of a prior art driving structure.
Figure 2:
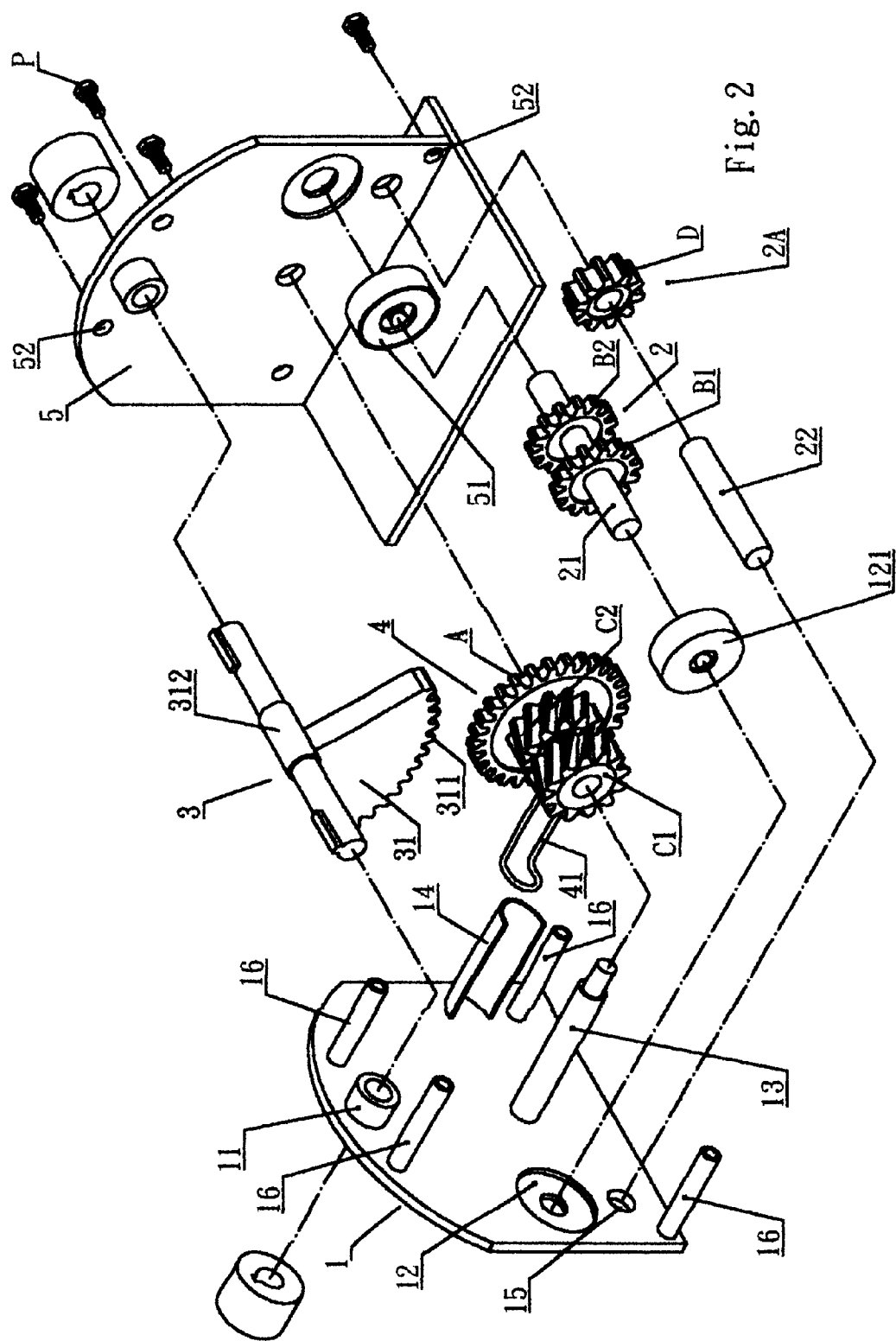
FIG. 2 is an exploded perspective view of the present invention.
Figure 3:
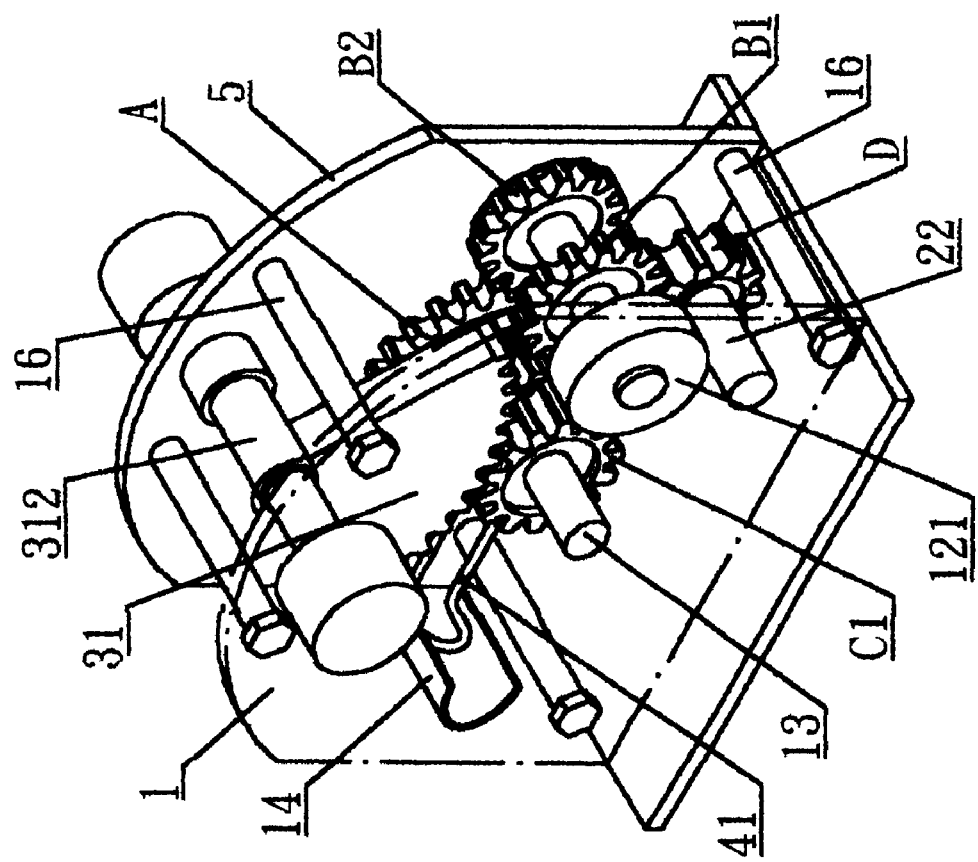
FIG. 3 is an assembled perspective view of the present invention.

Referring to FIGS. 1 and 2, the treading type vehicle driving device of the present invention is illustrated. The treading type vehicle driving device is formed by a substrate 1, a first transmission assembly 2 mounted to the substrate 1, a second transmission assembly 2A and a treadle structure 3, a gear assembly 4 exactly engaged to the first transmission assembly 2, second transmission assembly 2A, and treadle structure 3, and a position limiting plate 5 exactly confining the driving structure to the substrate 1.

The substrate 1 is installed with a retaining seat 11 for mounting a treadle structure 3, and a base L, and a bearing fixing seat 12. A retaining rod 13 and a confining seat 14 for being positioned and inserted by the gear assembly 4 are installed between the retaining seat 11 and the bearing fixing seat 12. The corners of the substrate 1 are protruded with locking seats 16 .

The first transmission assembly 2 includes a follower shaft 21 inserted to the bearing fixing seat 12 of the substrate 1 and the straight-cut gear B1 and straight-cut gear B2 positioned on the follower shaft 21. The straight-cut gear B2 is engaged to the straight-cut gear A of the gear assembly 4. The follower shaft 21 is exactly positioned to the hub of the rear wheel E for driving the rear wheel E to rotate synchronously.

The second transmission assembly 2A includes a driving shaft 22 firmly secured to the fixing hole 15 of the substrate 1 and a straight-cut gear D engaged to the driving shaft 22. The straight-cut gear D is engaged to the straight-cut gear B1 of the first transmission assembly 2.

The treadle structure 3 includes a slant-cut fan gear 31 engaged to the retaining seat 11 of the substrate 1, and a pedal 32 fixed to the axial rod of the slant-cut fan gear 31. The tilt gear surface 311 of the slant-cut fan gear 31 is exactly engaged to the slant-cut gears C1, C2 of the gear assembly 4 for driving the gear assembly 4 to move. The axial rod 312 of the slant-cut fan gear 31 protrudes from the middle section of the base L of the vehicle body. The protruding end is firmly secured with a pedal 32 for being treaded by a user.

The gear assembly 4 is formed by a straight-cut gear A, slant-cut gears C1 and C2, a positioning piece 41 positioned between the slant-cut gears C1 and C2. The positioning piece 41 is buckled and confined to the confining seat 14 of the substrate 1. The gear assembly 4 is inserted to the retaining rod 13 of the substrate 1. The straight-cut gear A can move reciprocally along the trenches of the slant-cut gears C1 and C2 by the slant-cut fan gear 31 so as to drive the straight-cut gear A to engage with the straight-cut gear B2 of the first transmission assembly 2 (treading forwards), or to engage with the straight-cut gear D of the second transmission assembly 2A (treading backwards). If the treading action is stopped, the straight-cut gear A will release from the straight-cut gear B2 or straight-cut gear D of the transmission assembly.

A bearing 51 is installed between the position limiting plate 5 and the first transmission assembly 2 for rotating the follower shaft 21. Four corners of the position limiting plate 5 are installed with through holes 52 matching the locking seats 16 of the substrate 1 for locking the stud P.

Figure 4A:
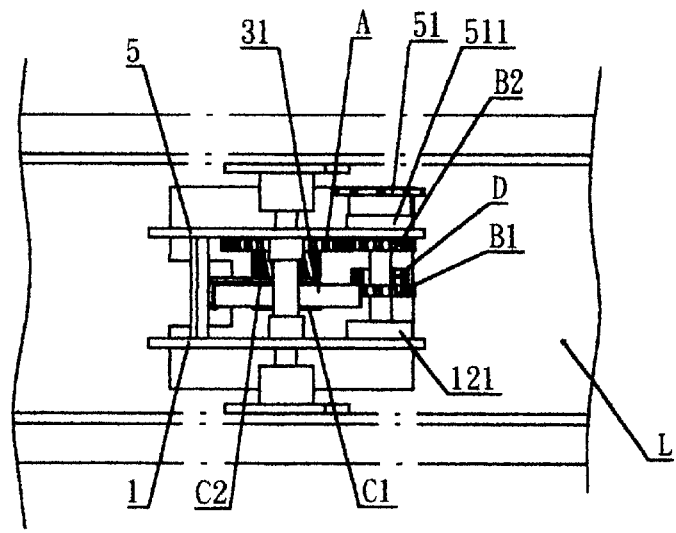
FIG. 4A is a plane view showing the pedal is treaded forwards according to the present invention.
Figure 4B:
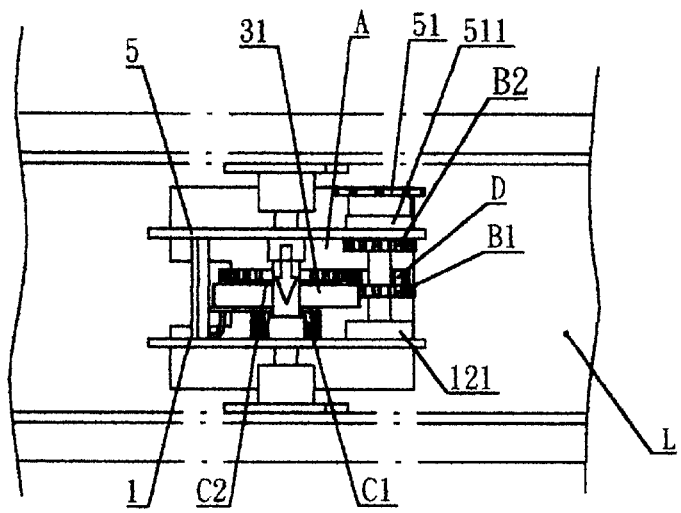
FIG. 4B is a plane view showing the pedal is treaded backwards according to the present invention.
Figure 4C:
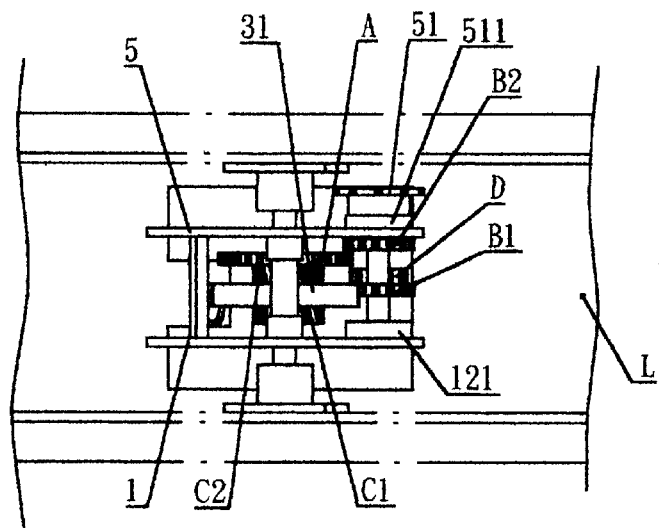
FIG. 4C is a plane view showing the wheel rotates idly according to the present invention.
Figure 5:
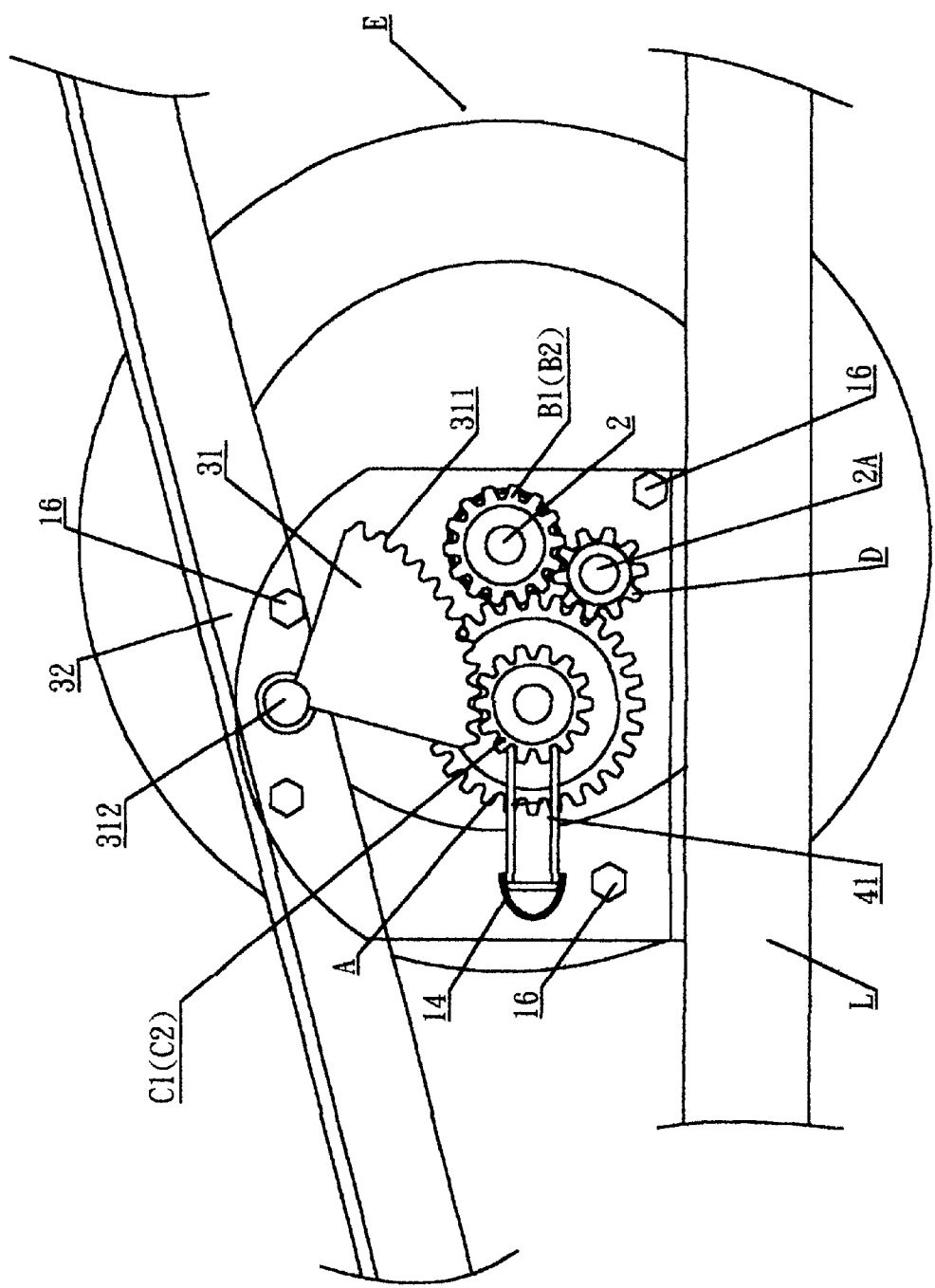
FIG. 5 is a lateral plane view of the present invention.

Referring to FIGS. 4 and 5, the operation of the present invention will be described. When the user treads forwards by one leg, the pedal 32 drives the slant-cut fan gear 31 of the treadle structure 3 to move. The tilt gear surface 311 of the slant-cut fan gear 31 drives the engaged slant-cut gear C1 to move along the edge of the gear. Thereby, the straight-cut gear A of the gear assembly 4 is driven to engage with the straight-cut gear B2 of the first transmission assembly 2. When the pedal 32 moves downwards, the straight-cut gear B2 will drive the follower shaft 21 and the rear wheel E to rotate synchronously (referring to FIG. 4A).

When the user treads backwards by one leg, the pedal 32 drives the slant-cut fan gear 31 of the treadle structure 3 to move along a reverse direction. Then the tilt gear surface 311 of the slant-cut fan gear 31 drives the engaged slant-cut gear C2 to move along the teeth edge so as to drive the straight-cut gear A of the gear assembly 4 to be engaged to the straight-cut gear D of the second transmission assembly 2A. When the pedal 32 is treaded downwards continuously, the straight-cut gear D will drive the engaged straight-cut gear B1 of the first transmission assembly 2 so as to drive the follower shaft 21 and the rear wheel E to rotate synchronously (referring to FIG. 4B).

When the treading action stops, the straight-cut gear A will separate from the engagement of the straight-cut gear B2 or straight-cut gear D of transmission assembly since the teeth trench of the slant-cut gears can move on the slant-cut fan gear 31(forwards is C1 and backwards is C2). Thereby, when the follower shaft 21 stops, wheels rotate continuously (idly) so as to move forwards rapidly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A treading type vehicle driving device comprising:

a substrate including a retaining seat for mounting a treadle structure, and a bearing fixing seat mounting with a driving structure by a bearing; a retaining rod and a confining seat for being positioned and inserted by a gear assembly being installed between the retaining seat and the bearing fixing seat;

a driving structure including a first transmission assembly and a second transmission assembly;

the first transmission assembly including a follower shaft inserted to the bearing fixing seat of the substrate and a straight-cut gear (B1) and a straight-cut gear (B2) positioned on the follower shaft; the straight-cut gear (B2) being engaged to a straight-cut gear (A) of the gear assembly; the follower shaft being exactly positioned to a hub of a rear wheel for driving the rear wheel to rotate synchronously;

the second transmission assembly including a driving shaft firmly secured to a fixing hole of the substrate and a straight-cut gear (D) engaged to the driving shaft; the straight-cut gear being engaged to the straight-cut gear of the first transmission assembly;

a treadle structure including a slant-cut fan gear engaged to the retaining seat of the substrate, and a pedal fixed to the axial rod of the slant-cut fan gear; a tilt gear surface of the slant-cut fan gear being exactly engaged to one of a pair of slant-cut gears of the gear assembly for driving the gear assembly to move; the axial rod of the slant-cut fan gear protruding from a middle section of the base of the vehicle body; a protruding end of the axial rod being firmly secured with a pedal; the base is installed with a confining structure for confining the movement of the pedal;

a position limiting plate for confining the driving structure to the substrate and the position limiting plate being matched to the first transmission assembly so that the rear wheel can drive the bearing;

wherein when the pedal is treaded forwards and backwards, the vehicle moves forwards rapidly with less power.

2. The treading type vehicle driving device as claimed in claim 1, wherein corners of the substrate are protruded with locking seats, and the position limiting plate is formed with through holes at positions matched to the locking seats so that studs are used to position the substrate and the position limiting plate.

3. The treading type vehicle driving device as claimed in claim 1, wherein the straight-cut gear (A) separates from the engagement of the straight-cut gear (B2) or straight-cut gear (D) of transmission assembly since the teeth trench of the slant-cut gears (forwards is C1 and backwards is C2) moves on the slant-cut fan gear; thereby, wheels rotate continuously.

* * * * *